United States Patent [19]

Seward, III

[11] 4,204,656

[45] May 27, 1980

[54] AIRSHIP CONTROL SYSTEM

[76] Inventor: DeWitt C. Seward, III, Box 434, Bethel, Conn. 06801

[21] Appl. No.: 921,266

[22] Filed: Jul. 3, 1978

Related U.S. Application Data

[63] Continuation-in-part of Ser. No. 765,093, Feb. 2, 1977, abandoned.

[51] Int. Cl.² .............................. B64B 1/02; B64B 1/24
[52] U.S. Cl. .......................................... 244/30; 244/51; 244/96; 244/190; 46/89
[58] Field of Search ................................. 244/25-33, 244/96, 51-52, 190, 1 R, 127, 128, 91; 46/77, 249, 253, 89; 358/109

[56] References Cited

U.S. PATENT DOCUMENTS

| | | | |
|---|---|---|---|
| 1,291,687 | 1/1919 | Reynolds et al. | 244/51 |
| 1,385,972 | 7/1921 | Upson | 244/33 |
| 1,869,256 | 7/1932 | Hines | 244/51 |
| 2,131,155 | 9/1938 | Waller | 244/51 |
| 2,668,026 | 2/1954 | Price | 244/52 |
| 3,957,228 | 5/1976 | Kennedy, Jr. | 244/33 |
| 3,957,230 | 5/1976 | Boucher et al. | 244/190 |

OTHER PUBLICATIONS

Seeman et al., "Remotely Piloted Mini-Blimp for Urban Applications", *Astronautics & Aeronautics*, Feb. 1974, pp. 31-33, 35.

*Primary Examiner*—Galen L. Barefoot

[57] ABSTRACT

The invention is a system for providing propulsion, control, and stability to small airships (miniblimps) in free flight, especially lighter than air airships. Propulsion is provided by a single motor. Control is achieved by moving the propulsion motor up or down, or left or right. Stability is provided by a single fixed control surface.

3 Claims, 2 Drawing Figures

AIRSHIP CONTROL SYSTEM

This patent is a continuation-in-part of application Ser. No. 765,093 filed Feb. 2, 1977, now abandoned.

BACKGROUND OF THE INVENTION

This invention relates to the control of airships in free flight. More particularly, it relates to the propulsion, control, and stabilization of lighter than air miniblimps.

Small airships, especially miniblimps, are in limited use at present. A major reason is that control systems presently available contain many parts such as linkages, gears, a multiplicity of propulsion motors, or are otherwise large and relatively heavy. The traditional approach to airship control has been to use airplane control systems with a resulting use of many components.

With airships, a very small increase in weight causes a significant increase in size. This is because lighter than air gases such as Helium provide approximately 0.07 pounds of lift per cubic foot. Hence, one pound of weight will need over 14 cubic feet of Helium to lift it. This is the factor which up to now has made airships large and bulky. Applicant's novel improvements to airship control will minimize size and weight. It will help to provide a practical miniblimp.

The following survey of prior art will show presently available control systems:

1. Wolfe shows a remotely controlled toy space ship in U.S. Pat. No. 3,292,304. For control it requires three drive motors, and is tethered. The extra drive motors require more weight than a single drive motored system. The tether is required since no control surfaces are provided for stability. This system is for tethered flight, and not suitable for freeflight.

2. Lawrence teaches pivoting motors as "accessory steering ascending and descending means," in U.S. Pat. No. 1,879,345. However, the many motors required, and the accessory rudders required are large and heavy, necessitating an impractically large airship.

3. Ragner, in "Build Control Line Blimp with your Soldering Iron," *American Modeler*, April, 1961 teaches how to build a toy blimp for tethered flight. The toy does not have a control means, in that the motor is fixed as are the four fins. It is impractical for free flight.

4. Seeman, et.al., in "Remotely Piloted Miniblimps," *Astronautics and Aeronautics*, February 1974 give a good discussion of the need for the miniblimp. However, the propulsion and control system for the airship is large and therefor heavy. Four control surfaces are provided, with movement causing elements for control (presumably). A large motor is provided with braces and other devices. The result is high weight, high cost, and impracticability.

5. Hines, in U.S. Pat. No. 1,869,256 describes a "combination flying machine and airship." Hines teaches the using of a propeller to function as a rudder. However, his invention requires separate motors for raising and lowering the airship. This multiplicity of motors requires much weight, requiring a large airship, and leading to an impractical device.

6. Waller, in U.S. Pat. No. 2,131,155 describes a single drive motor or engine for propulsion and to reduce the need for a vertical steering rudder. Waller still requires moveable control surfaces. Also, Waller neglects to provide a stabilizing surface or stabilizing means about the yaw axis a necessary feature in any practical airship or aircraft. Further, the plurality of brackets, gears, guide wires, and frame elements is such that the total weight has made the airship impractical for miniblimps.

What is needed is an airship control system of minimum size, complexity, and weight.

An object of the present invention is to provide an airship control system of minimum size, complexity and weight.

SUMMARY OF THE INVENTION

An airship control system is provided which is a new and novel method for providing propulsion, control, and stabilization of lighter than air miniblimps in freeflight. The airship control system consists of four essential elements, designed to work together in a complementary manner. The four elements are: a drive motor for propulsion; a bracket and motor to tilt the drive motor upward/downward for ascent and descent; a bracket and motor to face the drive motor leftward or rightward to turn the airship; a fixed vertical stabilizer without moving parts to provide stability about the yaw axis.

The novel features of this invention are set forth in detail in the appended claims. The invention will best be understood when read in connection with the accompanying drawings and descriptions.

DESCRIPTION OF THE PREFERRED EMBODIMENT

Figure 1:
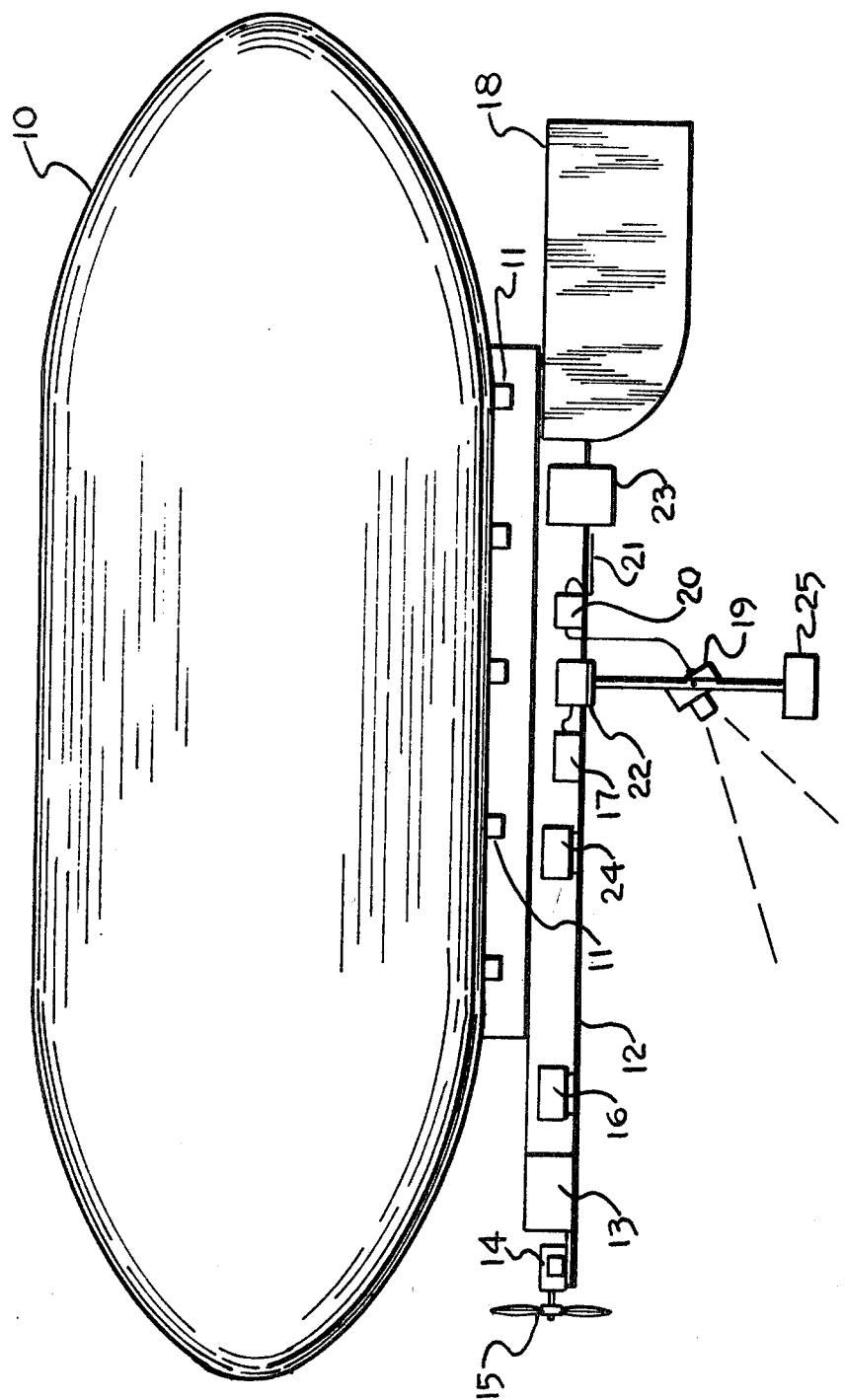
FIG. 1. Illustrates a freeflying remotely controlled lighter than air airship, shown from the left side.

A freeflying remotely controlled lighter than air airship is illustrated in FIG. 1. The airship receives its lift from the balloon, 10, filled with any lighter than air gas such as Helium. The balloon is inflated using the valves, 11. Attached to the balloon is the frame, 12. The frame is used as a mounting for each of the required elements. The frame also provides rigidity to the airship. To provide propulsion, a single drive motor, 14, is used to turn a propeller, 15, fixed to the drive motor shaft. Note that the drive motor could be mounted to the front or to the rear of the airship. The use of a single drive motor is a feature which is essential to the minimization of the system. Multiple drive motors increase the airship weight, leading to size and weight increases. The drive motor is normally electrical.

Directional control is provided by the directional control unit, 13, in FIG. 1. The directional control unit is detailed in FIG. 2. This unit has a bracket, 201 to which the drive motor, 14, is attached. Also attached to the bracket is a left/right motor, 202, to position the drive motor toward the left or right. This method uses the drive motor to apply force in the left direction to turn the airship right or in the right direction to turn the airship left. This method of directional control eliminates the need for a moveable rudder for steering, and helps to ensure the overall small size and light weight of the airship. This method of control also allows directional control to be applied at a high level of force at all speeds, including low speeds. This is an improvement over a traditional rudder which depends on forward speed for directional control.

Figure 2:
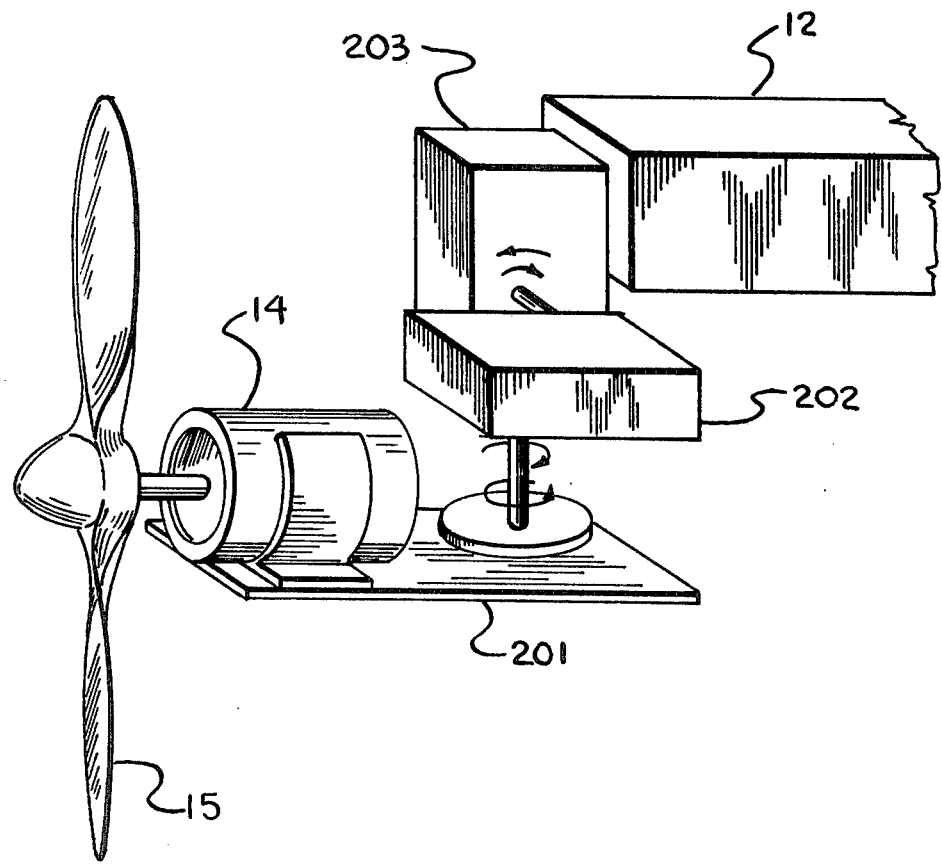
FIG. 2. Illustrates the details of the directional control unit.

The directional control unit also provides ascent/descent control using the ascent/descent motor, 203. The ascent/descent motor is attached directly to the frame, 12. It is also attached to the drive motor, 14, via the left/right motor as shown in FIG. 2. The ascent/decent motor can tilt the drive motor upward, imparting a force downward, thus pushing the airship upward. Similarly, the ascent/descent motor can tilt the drive motor downward, imparting a force upward, thus pushing the airship downward. This method of ascent/decent control eliminates the need for moveable ailerons for ascent/descent, and helps ensure the overall small size of the airship. This method also allows ascent/decent control to be applied at a high level of force at all speeds, including very low speeds. This is a great improvement over traditional attitude control using ailerons which depend on forward speed for ascent/descent control. Needless to say, there are many known combinations of suitable hardware which can be used to tilt the drive motor.

Drive motor speed is controlled by the drive motor control unit, 16, FIG. 1. The drive motor control unit can also cause the drive motor to stop or reverse. The directional control unit and the drive motor control unit receive control signals from the control command receiver, 17, which in turn receives signals transmitted from a remote control console.

Directional stability of the airship is provided by a vertical stabilizer, 18, FIG. 1. The vertical stabilizer is a fixed control surface with no moving parts, and no movement causing linkages or parts. The vertical stabilizer radiates from below the airship. This helps provide stability about the roll axis, and helps to counteract the torque of the drive motor. The use of a single fixed control surface is a critical weight and size saving feature. In some applications however, several fixed control surfaces, may be required, projecting radially from the airship.

The observation means of the airship is a miniature television camera, FIG. 1, 19. The television signal is sent to a television transmitter, 20, which transmits the signal to a remote location using a television antenna, 21. The field of view of the television camera can be changed using a television control unit, 22. The television control unit can cause the television camera to pan, tilt, zoom its lens, or turn off. Control signals are sent to the television control unit from the control command receiver, 17, which in turn receives the signals from a remote location.

The airship receives its energy from an energy storage unit, shown in FIG. 1, 23. The energy storage unit is normally a rechargeable battery pack. Any portable stored energy source could be used, depending on the application and environment.

Balance of the components is essential to provide trim of the airship. Prior to flight the components mounted to the drive motor in a slightly upward or downward position. Also, the location of as much weight as possible below the center of bouyancy is an essential step in order to ensure stability about the longitudinal roll axis.

What I claim is:

1. A freeflying miniblimp comprising a frame, a balloon containing lighter-than-air gas and a control system for said miniblimp, said control system consisting of:

a single drive motor, a propeller attached to said drive motor and rotated by said drive motor, a bracket to which is mounted said drive motor, an ascent/descent motor, first means for attaching said ascent/descent motor to said bracket to tilt said drive motor upward or downward, a left/right motor, second means for attaching said left/right motor to turn said drive motor left or right, a single fixed vertical stabilizer secured to said miniblimp and having an absence of moving parts, an energy source and control means for said motors functionally connected to said motors.

2. An airship control system for miniblimps as in claim 1 wherein said energy source and said motors are electrical.

3. A freeflying miniblimp as in claim 1 wherein said single fixed vertical stabilizer is located below the center of bouyancy of the airship.

* * * * *